US009063230B2

(12) United States Patent
Alland et al.

(10) Patent No.: US 9,063,230 B2
(45) Date of Patent: Jun. 23, 2015

(54) RADAR SENSOR MODULE

(71) Applicant: DELPHI TECHNOLOGIES, INC., Troy, MI (US)

(72) Inventors: Stephen W. Alland, Newbury Park, CA (US); Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 84 days.

(21) Appl. No.: 14/073,489

(22) Filed: Nov. 6, 2013

(65) Prior Publication Data
US 2014/0118179 A1    May 1, 2014

Related U.S. Application Data

(63) Continuation-in-part of application No. 13/119,307, filed on Mar. 16, 2011, now Pat. No. 8,604,968.

(51) Int. Cl.
*G01S 13/93* (2006.01)
*G01S 13/86* (2006.01)
(Continued)

(52) U.S. Cl.
CPC .............. *G01S 13/867* (2013.01); *G01S 7/025* (2013.01); *G01S 13/931* (2013.01); *G01S 2013/9392* (2013.01); *H01Q 1/1271* (2013.01); *H01Q 1/3291* (2013.01); *H01Q 9/0435* (2013.01); *H01Q 15/04* (2013.01); *H01Q 21/0075* (2013.01); *H01Q 21/08* (2013.01)

(58) Field of Classification Search
CPC ................................ G01S 13/931; G01S 7/025

USPC ....................................................... 342/70, 22
See application file for complete search history.

(56) References Cited

U.S. PATENT DOCUMENTS 5,525,988 A   6/1996  Perkins et al.
5,757,319 A   5/1998  Loo et al.
(Continued)

FOREIGN PATENT DOCUMENTS

CA        2202320       10/1997
DE    10 2009 002626 A1   10/2010
(Continued)

OTHER PUBLICATIONS

Supplementary European Search Report dated Feb. 5, 2014.
(Continued)

*Primary Examiner* — Timothy A Brainard
(74) *Attorney, Agent, or Firm* — Lawrence D. Hazelton

(57) ABSTRACT

A sensor module configured to be located behind a window of a vehicle to detect an object through the window and about the vehicle. The module includes a radar unit with an antenna and a controller. The antenna emits and/or receives a radar signal through the window with a selected or preferred polarization. The polarization determines a preferred angle of propagation of the radar signal through the window based on reflection characteristics of the window that vary with impingement angle and transmitted polarization. By varying the transmitted polarization vs. beam direction when a directional antenna is used, the signal propagating through the windshield can be maximized to enhance object detection over a range of signal directions. Also, by varying the transmitted polarization when an omnidirectional type antenna is used, the object can be 'illuminated' with variable intensity and detected with variable sensitivity.

15 Claims, 11 Drawing Sheets

(51) Int. Cl.
*G01S 7/02* (2006.01)
*H01Q 1/12* (2006.01)
*H01Q 1/32* (2006.01)
*H01Q 9/04* (2006.01)
*H01Q 15/04* (2006.01)
*H01Q 21/00* (2006.01)
*H01Q 21/08* (2006.01)

(56) References Cited

U.S. PATENT DOCUMENTS

| | | | |
|---|---|---|---|
| 5,861,845 | A | 1/1999 | Lee et al. |
| 6,278,399 | B1 | 8/2001 | Ashihara |
| 6,452,535 | B1 | 9/2002 | Rao et al. |
| 6,511,216 | B2 | 1/2003 | Strickland |
| 6,771,208 | B2 | 8/2004 | Lutter et al. |
| 6,862,537 | B2 | 3/2005 | Skrbina et al. |
| 7,095,567 | B2 | 8/2006 | Troxell et al. |
| 7,322,755 | B2 | 1/2008 | Neumann et al. |
| 7,706,978 | B2 | 4/2010 | Schiffmann et al. |
| 7,737,832 | B2 | 6/2010 | Baratoff et al. |
| 8,294,608 | B1 | 10/2012 | Lynam |
| 2003/0154010 | A1 | 8/2003 | Rao et al. |
| 2003/0201929 | A1 | 10/2003 | Lutter et al. |
| 2006/0034002 | A1 | 2/2006 | Troxell et al. |
| 2006/0125919 | A1 | 6/2006 | Camilleri et al. |
| 2006/0146552 | A1 | 7/2006 | Shafer et al. |
| 2007/0055446 | A1 | 3/2007 | Schiffmann et al. |
| 2007/0190760 | A1 | 8/2007 | Coolbaugh et al. |
| 2009/0204291 | A1 | 8/2009 | Cernasov |
| 2010/0001897 | A1* | 1/2010 | Lyman .................. 342/70 |
| 2010/0084176 | A1 | 4/2010 | Kim |
| 2011/0163904 | A1 | 7/2011 | Alland et al. |

FOREIGN PATENT DOCUMENTS

| | | |
|---|---|---|
| JP | 2006-188224 | 7/2006 |
| JP | 2007-248167 A | 9/2007 |

OTHER PUBLICATIONS

Granet, G., et al.: "New method for analysis of constrained metal plate lens", Electromagnetics in Advanced Applications, 2007. ICEAA 2007, International Conference on, IEEE, PI, Sep. 1, 2007, p. 504-506. SO031163770, ISBN: 978-1-4244-0766-8.

European Search Report dated Apr. 1, 2015.

* cited by examiner

RADAR SENSOR MODULE

CROSS-REFERENCE TO RELATED APPLICATION

This application is a continuation-in-part application and claims the benefit of U.S. patent application Ser. No. 13/119,307, entitled INTEGRATED RADAR-CAMERA SENSOR, and filed on Oct. 6, 2009, which claims the benefit under 35 U.S.C. §119(e) of U.S. Provisional Patent Application No. 61/103,680 filed on Oct. 8, 2008, the entire disclosure of which is hereby incorporated herein by reference.

TECHNICAL FIELD OF INVENTION

The present invention generally relates to an integrated radar and camera module (RACam) for detecting the presence of an object, and more specifically relates to such a sensor module that detects objects, such as objects near a vehicle, for enhanced vehicle safety.

BACKGROUND OF INVENTION

Radar and camera sensors are often employed on vehicles to enable systems for enhanced vehicle safety including Adaptive Cruise Control (ACC), Forward Collision Warning (FCW), collision mitigation, or avoidance via autonomous braking, pre-crash functions such as airbag arming or pre-activation, and Lane Departure Warning (LDW). Systems that employ both radar and camera sensors provide high level active safety capability and are available on production vehicles. However, the cost of conventional systems is typically high and integration into the vehicle system is generally complex, due to the need for multiple sensors at multiple locations, currently limiting these systems to optional equipment on luxury vehicles.

Integration of the radar and camera sensor for use in a vehicle could significantly reduce sensor cost and vehicle integration cost to enable high capability active safety systems to be offered as standard equipment on many vehicles. However, many design challenges need to be overcome to effectively implement an integrated radar-camera sensor that meets application requirements and vehicle integration constraints.

SUMMARY OF THE INVENTION

In accordance with one embodiment, a sensor module is provided. The sensor module is configured to be located behind a window of a vehicle to detect an object through the window and in an area about the vehicle. The module includes an antenna (i.e. a radar sensor) and a controller (i.e. processing circuitry). The antenna is configured to emit a radar signal through the window and into the area. The radar signal is characterized by a transmitted polarization of the radar signal. The transmitted polarization is influenced by a first transmit signal received at a first port of the antenna and a second transmit signal received at a second port of the antenna. The controller is configured to output the first transmit signal and the second transmit signal. The first transmit signal is characterized by a first characteristic, and the second transmit signal is characterized by a second characteristic. A relative difference between the first characteristic and the second characteristic is selected based on a preferred angle of propagation of the radar signal through the window.

In another embodiment, a sensor module is provided. The sensor module is configured to be located behind a window of a vehicle to detect objects through the window and in an area about the vehicle. The module includes an antenna (i.e. a radar sensor) and a controller (i.e. processing circuitry). The antenna is configured to output a first detection signal and a second detection signal in response to a reflected signal from the area that passes through the window and impinges on the antenna. The reflected signal is characterized by a received polarization of the reflected signal. The controller is configured to receive the first detection signal and the second detection signal. The first detection signal is characterized by a first characteristic, and the second detection signal is characterized by a second characteristic. A relative difference between the first characteristic and the second characteristic is indicative of a preferred angle of propagation of the reflected signal through the window.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
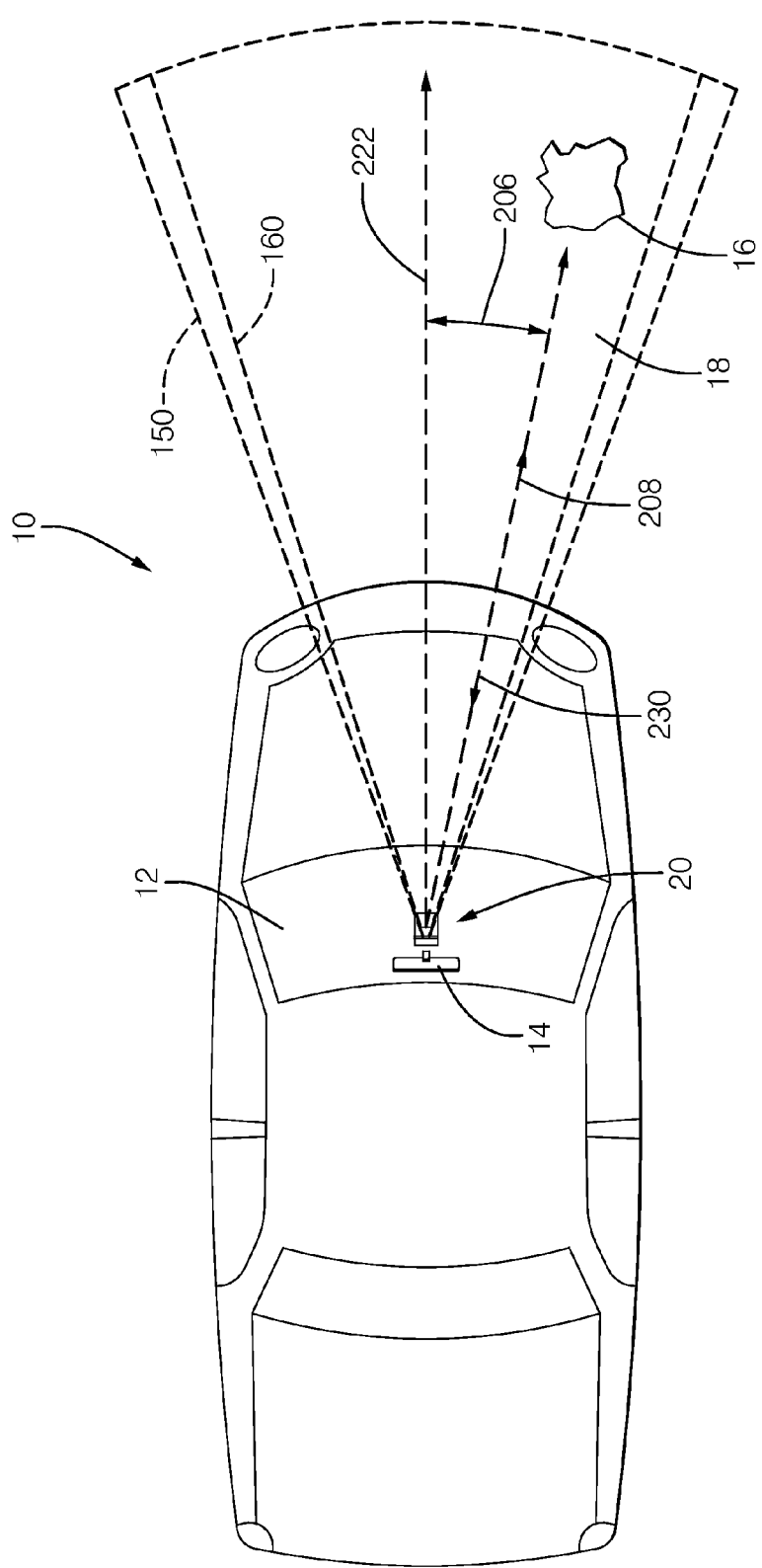
FIG. 1 is a top view of a vehicle equipped with a sensor module, according to one embodiment.

FIG. 1 illustrates a non-limiting example of a vehicle 10. The vehicle 10 is equipped with a sensor module 20, hereafter the module 20, which is generally shown located in an interior compartment of the vehicle behind a window 12 of the vehicle 10. While an automobile is illustrated, it will be evident that the module 20 may also be suitable for use on other vehicles such as heavy duty on-road vehicles like semi-tractor-trailers, and off-road vehicles such as construction equipment. In this non-limiting example, the module 20 is located behind the windshield and generally forward of a rearview minor 14. Alternatively, the module 20 may be positioned to 'look' through a side or rear window of the vehicle 10.

The module 20 includes a radar unit 30 (FIG. 2) for transmitting radar signals through the window 12 to detect an object 16 through the window 12 and in an area 18 about the vehicle 10. In the example, the area 18 is shown as generally forward of the vehicle 10 and includes a radar field of view defined by dashed lines 150. The radar unit 30 receives reflected radar signals that are reflected by the object 16 when located in the radar field of view. As will become apparent in the description that follow, the module 20 includes features particularly directed to overcoming problems with detecting objects when the radar signals used to do so must pass through the window 12. Optionally, the module 20 may include a camera 22 (FIG. 2) for capturing images through the window 12 in a camera field of view defined by dashed line 160.

The module 20 is generally configured to detect one or more objects relative to the vehicle 10. Additionally, the module 20 may have further capabilities to estimate the parameters of the detected object(s) including, for example, the object position and velocity vectors, target size, and classification, e.g., vehicle verses pedestrian. The module 20 may be employed onboard the vehicle 10 for automotive safety applications including adaptive cruise control (ACC), forward collision warning (FCW), and collision mitigation or avoidance via autonomous braking and lane departure warning (LDW).

Figure 2:
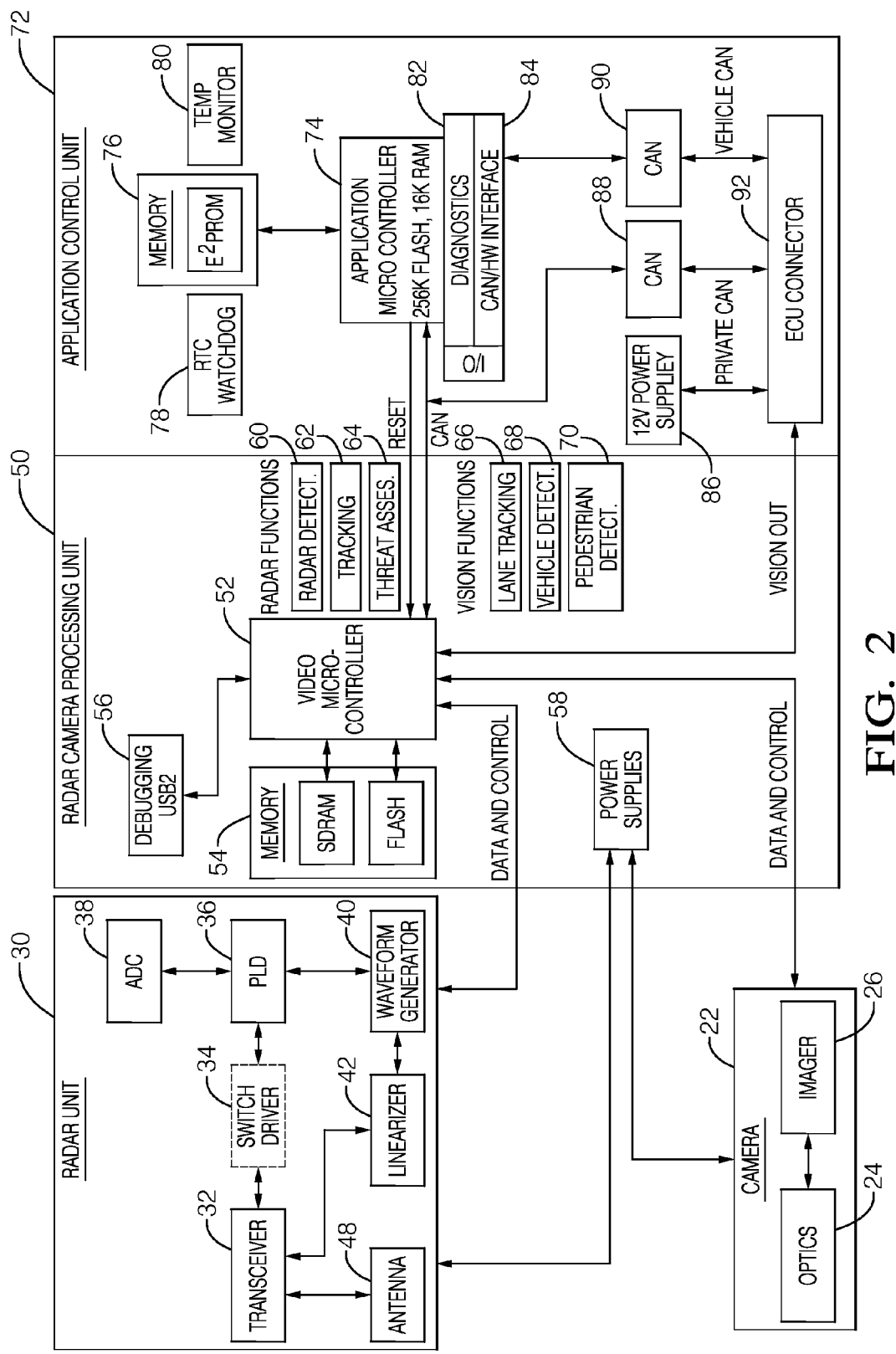
FIG. 2 is a block diagram of the module of FIG. 1, according to one embodiment.

If the camera 22 is included, the module 20 may be configured to advantageously integrate both radar unit 30 and the camera 22 in a single module contained within a common housing. The module 20 is advantageously installed within the passenger compartment of the vehicle 10, behind the window 12 and in front of the rearview minor 14. The integration of the camera 22 and the radar unit 30 into a common single assembly (the module 20) advantageously provides a reduction in sensor costs. Additionally, the camera 22 and radar unit 30 integration advantageously employs common or shared electronics and signal processing as shown in FIG. 2. Furthermore, placing the radar unit 30 and the camera 22 in the same housing simplifies aligning these two parts so a location of the object 16 relative to the vehicle 10 base on a combination of radar and image data (i.e.—radar-camera data fusion) is more readily determined.

Figure 3:
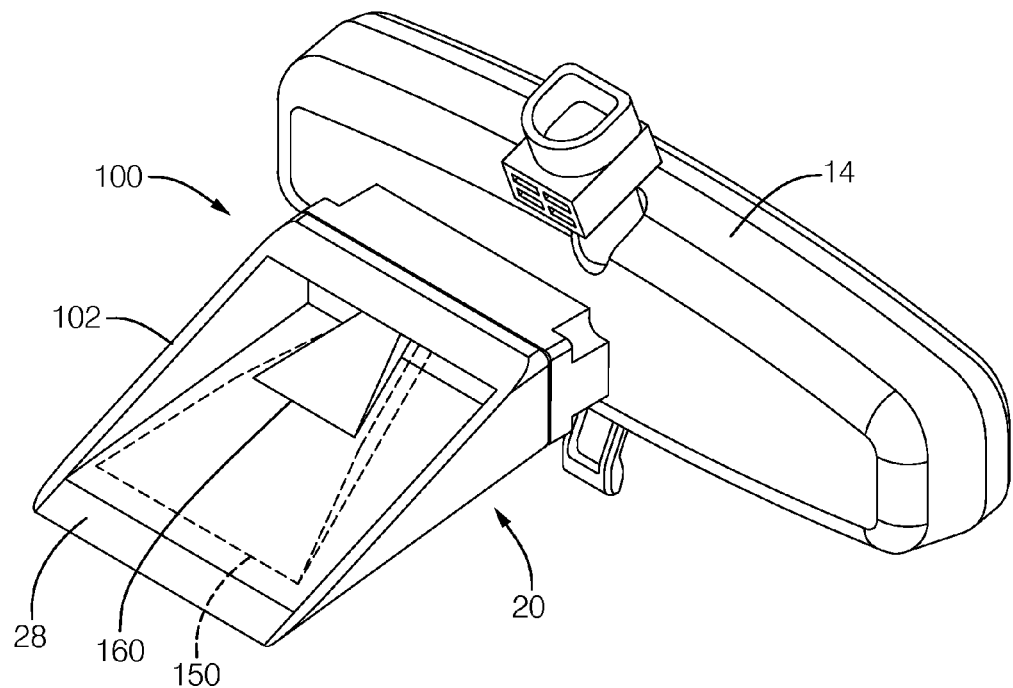
FIG. 3 is a perspective view of the module of FIG. 1, according to one embodiment.
Figure 4:
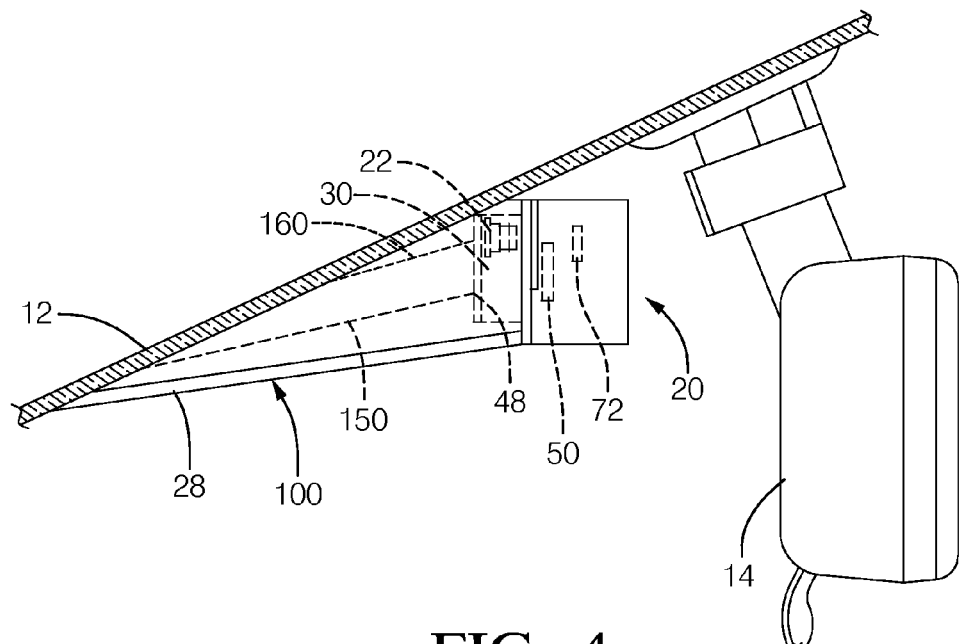
FIG. 4 is a side view of the module of FIG. 1, according to one embodiment.

The module 20 advantageously employs a housing 100 comprising a plurality of walls as shown in FIGS. 3 and 4, according to one embodiment. The module 20 includes a camera 22 located in the housing 100 for capturing images based on light waves. The module 20 also includes a radar unit 30 located within the housing 100 for emitting a radar beam and receiving reflected radar signals. The module 20 further includes a radar-camera processing unit 50 for processing the captured images and the received reflected radar signals and providing an indication of the detection of the presence of one or more objects detected in the coverage zones defined by the dashed lines 150 and the dashed lines 160.

The module 20 is shown in FIG. 2 having various components, according to one embodiment. The module 20 includes the radar unit 30, the camera 22, the radar-camera processing unit 50, and an application control unit 72. The radar unit 30 and camera 22 both communicate with the radar-camera processing unit 50 to process the received radar signals and camera generated images so that the sensed radar and camera signals are useful for various radar and vision functions. The application control unit 72 may be integrated within the radar-camera processing unit or may be separate therefrom. The application control unit 72 may execute any of a number of known applications that utilize the processed radar and camera signals including, but not limited to ACC, FCW, and LDW.

The camera 22 is shown in FIG. 2 including both the optics 24 and an imager 26. It should be appreciated that the camera 22 may include a commercially available off the shelf camera for generating video images. For example, the camera 22 may include a wafer scale camera, or other image acquisition device. Camera 22 receives power from the power supply 58 of the radar-camera processing unit 50 and communicates data and control signals with a video microcontroller 52 of the radar-camera processing unit 50.

The radar unit 30 is shown having a transceiver 32 coupled to an antenna 48. The transceiver 32 and antenna 48 operate to transmit radar signals within the desired coverage zone or beam defined by the dashed lines 150 and to receive reflected radar signals reflected from objects within the coverage zone defined by the dashed lines 150. The radar unit 30 may transmit a single fan-shaped radar beam and form multiple receive beams by receive digital beamforming, according to one embodiment. The antenna 48 may include a vertical polarization antenna for providing vertical polarization of the radar signal which provides good propagation over incidence (rake) angles of interest for the windshield, such as a seventy degree (70°) incidence angle. Alternately, a horizontal polarization antenna may be employed; however, the horizontal polarization is more sensitive to the RF properties and parameters of the windshield for high incidence angle.

The radar unit 30 may also include a switch driver 34 coupled to the transceiver 32 and further coupled to a programmable logic device (PLD 36). The programmable logic device (PLD) 36 controls the switch driver in a manner synchronous with the analog-to-digital converter (ADC 38) which, in turn, samples and digitizes signals received from the transceiver 32. The radar unit 30 also includes a waveform generator 40 and a linearizer 42. The radar unit 30 may generate a fan-shaped output which may be achieved using electronic beam forming techniques. One example of a suitable radar sensor operates at a frequency of 76.5 gigahertz. It should be appreciated that the automotive radar may operate in one of several other available frequency bands, including 24 GHz ISM, 24 GHz UWB, 76.5 GHz, and 79 GHz.

The radar-camera processing unit 50 is shown employing a video microcontroller 52, which includes processing circuitry, such as a microprocessor. The video microcontroller 52 communicates with memory 54 which may include SDRAM and flash memory, amongst other available memory devices. A device 56 characterized as a debugging USB2 device is also shown communicating with the video microcontroller 52. The video microcontroller 52 communicates data and control with each of the radar unit 30 and camera 22. This may include the video microcontroller 52 controlling the radar unit 30 and camera 22 and includes receiving images from the camera 22 and digitized samples of the received reflected radar signals from the radar unit 30. The video microcontroller 52 may process the received radar signals and camera images and provide various radar and vision functions. For example, the radar functions executed by video microcontroller 52 may include radar detection 60, tracking 62, and threat assessment 64, each of which may be implemented via a routine, or algorithm. Similarly, the video microcontroller 52 may implement vision functions including lane tracking function 66, vehicle detection 68, and pedestrian detection 70, each of which may be implemented via routines or algorithms. It should be appreciated that the video microcontroller 52 may perform various functions related to either radar or vision utilizing one or both of the outputs of the radar unit 30 and camera 22.

The application control unit 72 is shown communicating with the video microcontroller 52 by way of a controller area network (CAN) bus and a vision output line. The application control unit 72 includes an application microcontroller 74 coupled to memory 76 which may include electronically erasable programmable read-only memory (EEPROM), amongst other memory devices. The application control unit 72 is also shown including an RTC watchdog 78, temperature monitor 80, and input/output interface for diagnostics 82, and CAN/HW interface 84. The application control unit 72 includes a twelve volt (12V) power supply 86 which may be a connection to the vehicle battery. Further, the application control unit 72 includes a private CAN interface 88 and a vehicle CAN interface 90, both shown connected to an electronic control unit (ECU) that is connected to connector 92.

The application control unit 72 may be implemented as a separate unit integrated within the module 20 or may be located remote from the module 20 and may be implemented with other vehicle control functions, such as a vehicle engine control unit. It should further be appreciated that functions performed by the application control unit 72 may be performed by the video microcontroller 52, without departing from the teachings of the present invention.

The camera 22 generally captures camera images of an area in front of the vehicle 10. The radar unit 30 may emit a fan-shaped radar beam so that objects generally in front of the vehicle reflect the emitted radar back to the sensor. The radar-camera processing unit 50 processes the radar and vision data collected by the corresponding camera 22 and radar unit 30 and may process the information in a number of ways. One example of processing of radar and camera information is disclosed in U.S. Patent Application Publication No. 2007/0055446, which is assigned to the assignee of the present application, the disclosure of which is hereby incorporated herein by reference.

Referring to FIGS. 3 and 4, the module 20 is generally illustrated having a housing 100 containing the various components thereof. The housing 100 may include a polymeric or metallic material having a plurality of walls that generally contain and enclose the components therein. The housing 100 has an angled surface 102 shaped to conform to the interior shape of the window 12. Angled surface 102 may be connected to window 12 via an adhesive, according to one embodiment. According to other embodiments, housing 100 may otherwise be attached to window 12 or to another location behind the window 12 within the passenger compartment of the vehicle 10.

The module 20 has the camera 22 generally shown mounted near an upper end and the radar unit 30 is mounted generally therebelow. However, the camera 22 and radar unit 30 may be located at other locations relative to each other. The radar unit 30 may include an antenna 48 that is vertical oriented mounted generally at the forward side of the radar unit 30 for providing a vertical polarized signal. The antenna 48 may be a planar antenna such as a patch antenna. A glare shield 28 is further provided shown as a lower wall of the housing 100 generally below the camera 22. The glare shield 28 generally shields light reflection or glare from adversely affecting the light images received by the camera 22. This includes preventing glare from reflecting off of the vehicle dash or other components within the vehicle and into the imaging view of the camera 22. Additionally or alternately, an electromagnetic interference (EMI) shield may be located in front or below the radar unit 30. The EMI shield may generally be configured to constrain the radar signals to a generally forward direction passing through the window 12, and to prevent or minimize radar signals that may otherwise pass into the vehicle 10. It should be appreciated that the camera 22 and radar unit 30 may be mounted onto a common circuit board which, in turn, communicates with the radar-camera processing unit 50, all housed together within the housing 100.

Figure 5:
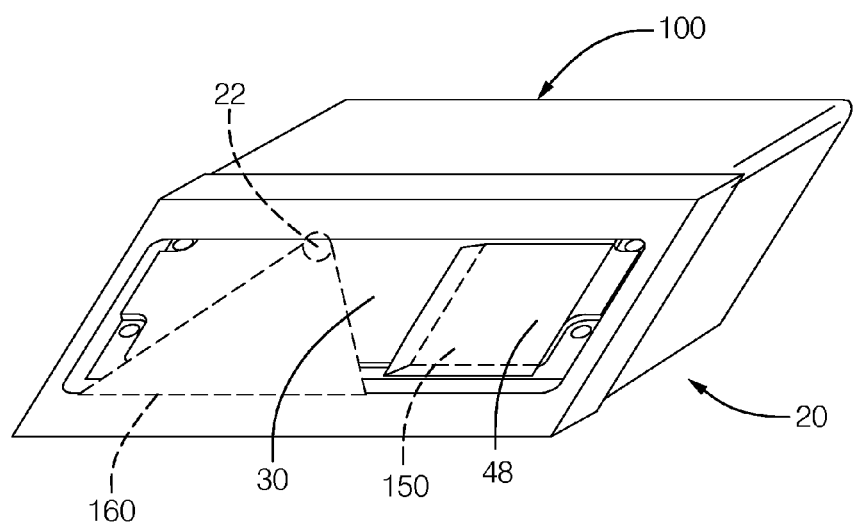
FIG. 5 is a perspective cut-away view of the module of FIG. 1, according to one embodiment.
Figure 6:
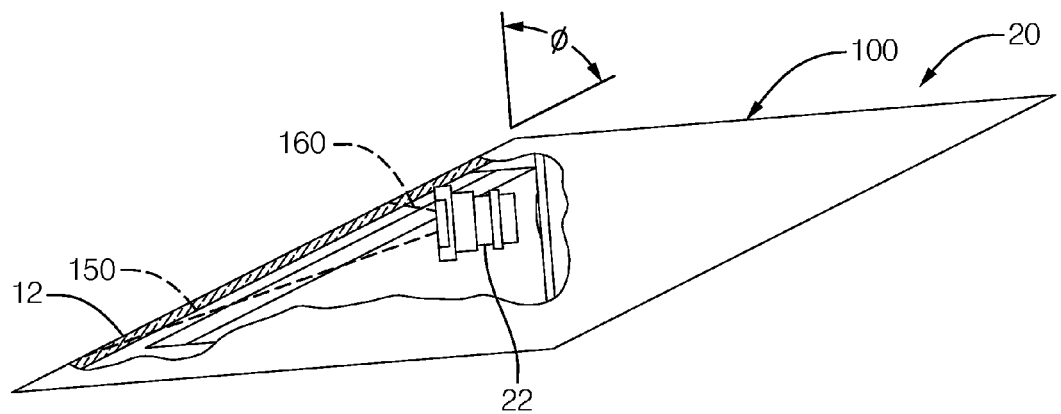
FIG. 6 is a side cut-away view of the module of FIG. 1, according to one embodiment.

Referring to FIGS. 5 and 6, a module 20 is generally illustrated having an antenna 48 that can be tilted and oriented in a plane at any angle relative to the vertical axis, according to another embodiment. Thus, the antenna 48 is tilted at an angle Ø relative to the vertical orientation of the embodiment shown in FIG. 4. According to one embodiment, the radar antenna may be tilted at angle Ø in the range of about ten degrees) (10° to seventy degrees (70°)relative to the vertical orientation. According to one embodiment, the antenna 48 is tilted at the same angle Ø generally as the angle of the window 12. By tilting the antenna 48, the height of the housing 100 may be reduced. However, in order to compensate for the tilting of the antenna 48, the radar beam is squinted downward to illuminate the required coverage zone. Squinting of the radar signal may be achieved by an antenna feed network providing a designed phase slope.

Figure 7:
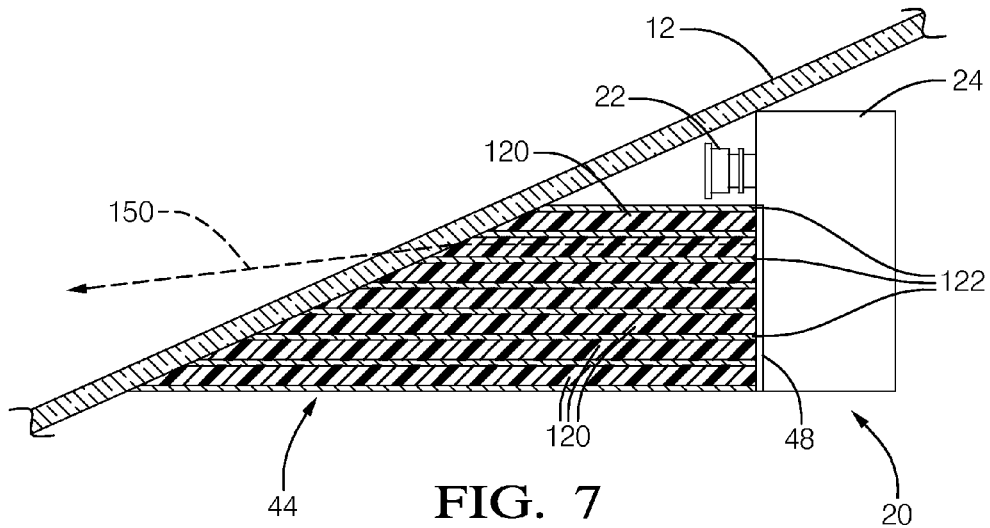
FIG. 7 is a side cross-sectional view of an integrated radar-camera sensor employing an electromagnetic interference (EMI) shield, according to another embodiment.

Referring to FIG. 7, a module 20 is illustrated according to a third embodiment employing a parallel plate lens structure 44 generally positioned forward of the radar unit 30. The parallel plate lens also functions as an EMI shield. The parallel plate lens structure 44 includes a plurality of substantially horizontal arrangement of conductive parallel plates 122 or conductive sheets extending from the antenna 48 (vertical oriented) of the radar unit 30 to the interior surface of the window 12. The conductive parallel plates 122 may comprise parallel copper sheets which are dielectrically isolated from each other and are separated therefrom by a distance such as one half the operating wavelength of the radar in the lens, where the operating wavelength in the lens depends on the free space wavelength of the radar and the properties of the material, if any, used between the parallel plates. In the embodiment shown, the parallel plate lens structure 44 further includes a dielectric foam 120 disposed between adjacent layers of the conductive parallel plates 122. The dielectric foam is electrically nonconductive and supports the horizontal layering of the conductive parallel plates 122. The dielectric foam 120 has a dielectric constant that provides beam squint in the downward direction such that the radar beam is redirected at an adjusted angle toward the roadway in front of the vehicle 10 as it passes through the window 12. In effect, the conductive parallel plates 122 and dielectric foam 120 may operate as a lens which extends the antenna aperture up to the window 12 and squints down the radar beam while operating as an electromagnetic interference shield. The EMI shield may encompass the fan out of the radar beam beginning from the antenna out to the projection of the beam on the windshield. The parallel plate lens serves to reduce the size of the EMI shield since, when using the lens, the radar beam does not fan out until it reaches the window 12. Without incorporating the lens into the EMI shield, the radar beam projection on the windshield is much larger necessitating a much larger EMI shield.

Figure 8:
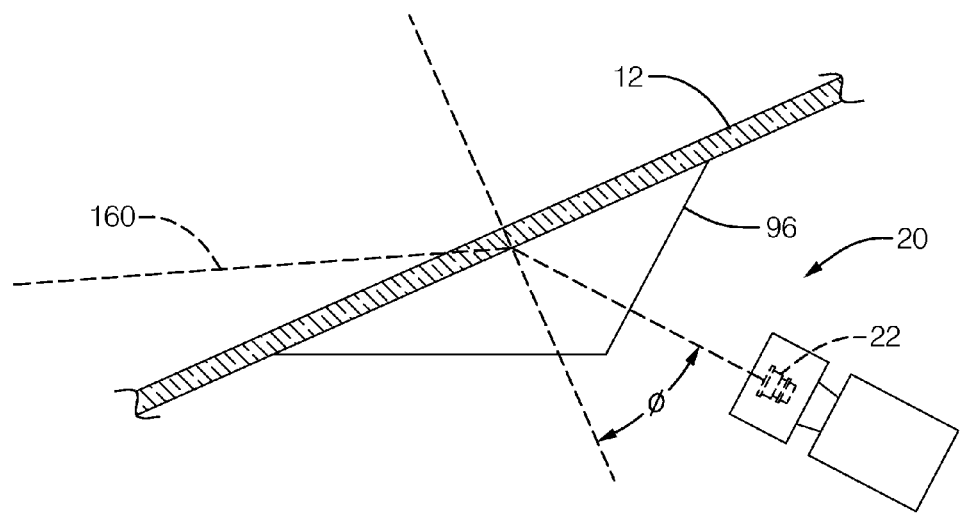
FIG. 8 is a side view of an integrated radar-camera sensor employing a refractive block, according to a further embodiment.

Referring to FIG. 8, a refractive block 96 is shown adhered to the front interior surface of the window 12 in front of the camera 22 such that the refractive block 96 is in the optical line of sight of camera 22. The refractive block 96 may include a light-entrance surface configured to be mounted in contact with a refractive boundary of the vehicle, namely, the window 12, and a light exit surface wherein the refractive block 96 is configured to refract an optical path of light corresponding to an imaged area and to direct the light to an image sensing component, namely, the camera 22. Light enters the refractive block 96 and enters into an air gap before entering the lens of the camera 22 as shown. Alternately, the air gap may be eliminated with proper lens optimization. The bottom and sides of the refractive block 96 may further be roughened to reduce reflectivity and may be painted an opaque color, such as black. One example of the refractive block 96 is disclosed in U.S. Pat. No. 7,095,567, assigned to the assignee of the present application, the entire disclosure of which is hereby incorporated herein by reference.

The refractive block 96 is shown having an incidence angle Ø of approximately seventy degrees (70°), according to one example. The incidence angle Ø generally is the angle between the camera 22 and the window 12 and a line perpendicular to the window 12. As optical light captured by the camera 22 passes through the window 12 and the refractive block 96, the light images are refracted toward the camera 22. The opaque surface on the bottom side of the refractive block 96 and also on the sides thereof may advantageously prevent reflectivity of light or glare to the camera 22 thereby providing the function of a glare shield but with smaller overall dimensions than a conventional glare shield. The refractive block 96 may further operate to shield the radar unit 30 from electromagnetic interference.

Figure 9:
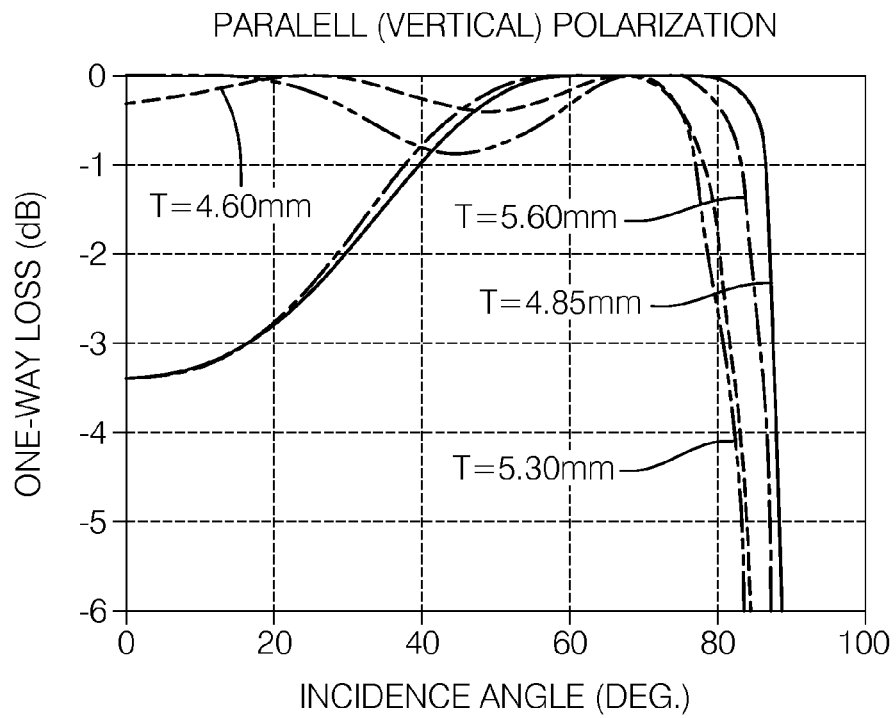
FIG. 9 is a graph illustrating reflection loss versus incidence angle for parallel (vertical) polarization provided by a radar antenna.
Figure 10:
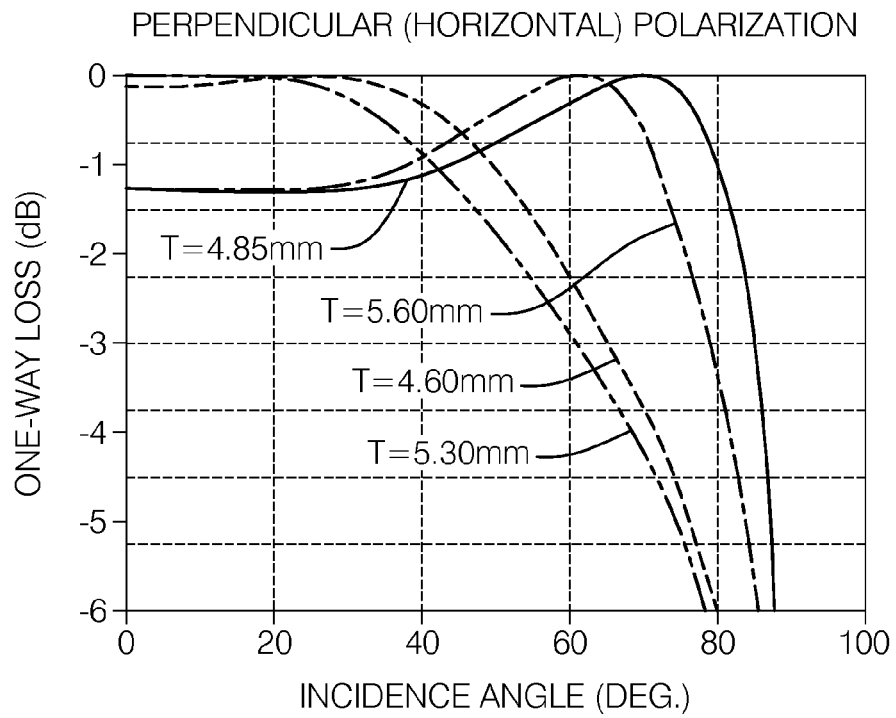
FIG. 10 is a graph illustrating reflection loss versus incidence angle for a perpendicular (horizontal) polarization provided by a radar antenna.
Figure 11:
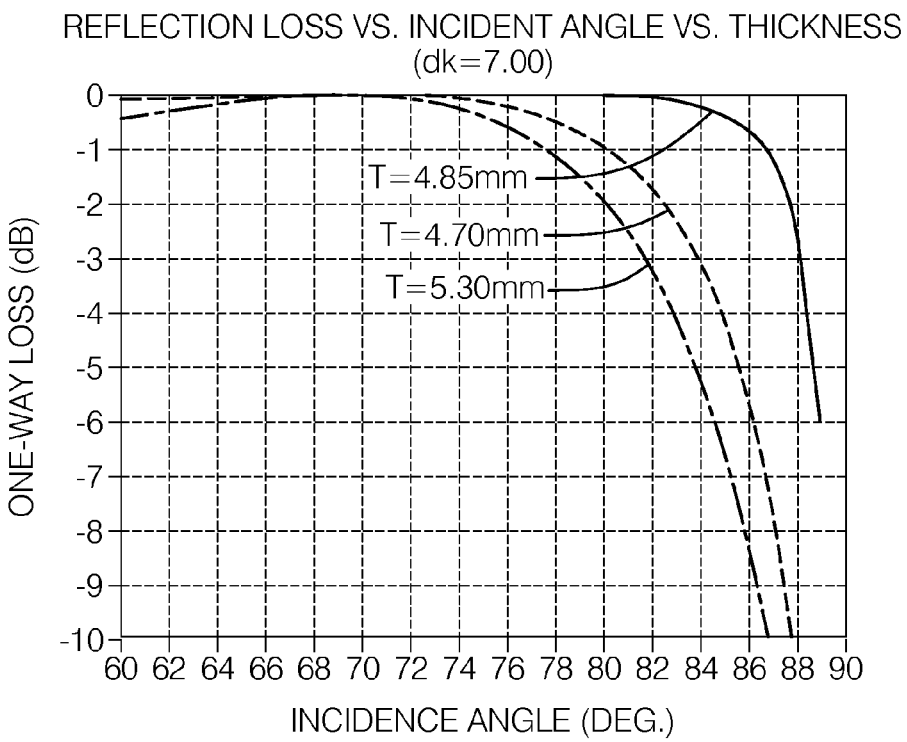
FIG. 11 is a graph illustrating sensitivities near and beyond the Brewster angle at 76.5 gigahertz (GHz) vertical polarization.
Figure 12:
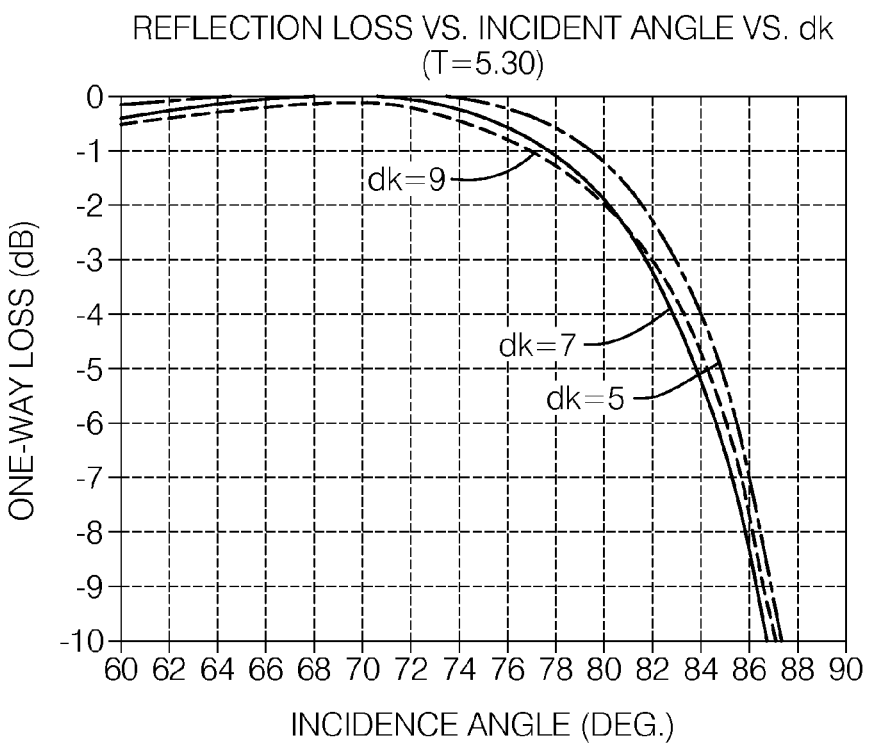
FIG. 12 is a graph illustrating sensitivities near and beyond the Brewster angle at 76.5 gigahertz vertical polarization.

The antenna 48 is designed with vertical polarization to mitigate RF propagation issues which may be introduced by the window 12. The typical vehicle windshield reflection loss may vary depending upon thickness and incidence angle of the window 12. The one-way reflection loss in decibels (dB) at a radar frequency of 76.5 GHz and using parallel (vertical) polarization achieved with the antenna 48 configured for vertical polarization is illustrated in FIG. 9 for a windshield having various thicknesses and as a function of incidence angle of the windshield in degrees. The vertical polarization provides good propagation near seventy degree (70°) incidence angle with low sensitivity to incidence angle and windshield thickness. In contrast, a perpendicular (horizontal) polarization antenna is much more sensitive to incidence angle and windshield thickness and typically generates greater reflection loss in a windshield as shown in FIG. 10. Accordingly, the parallel vertical polarization antenna provides better propagation for typical windshield parameters. The sensitivities near and beyond the Brewster angle at a frequency of 76.5 GHz for vertical polarization is illustrated in FIGS. 11 and 12. The graphs shown in FIGS. 11 and 12 generally illustrate the reflection loss versus incidence angle versus windshield thickness in FIG. 11 and versus windshield dielectric constant (dk) in FIG. 12. The reflection loss is relatively insensitive to thickness for an incidence angle of less than seventy-eight degrees (78°), and the reflection loss is relatively insensitive to dk for nominal dk of 7.0 (the typical dk for windshield glass).

Figure 13:
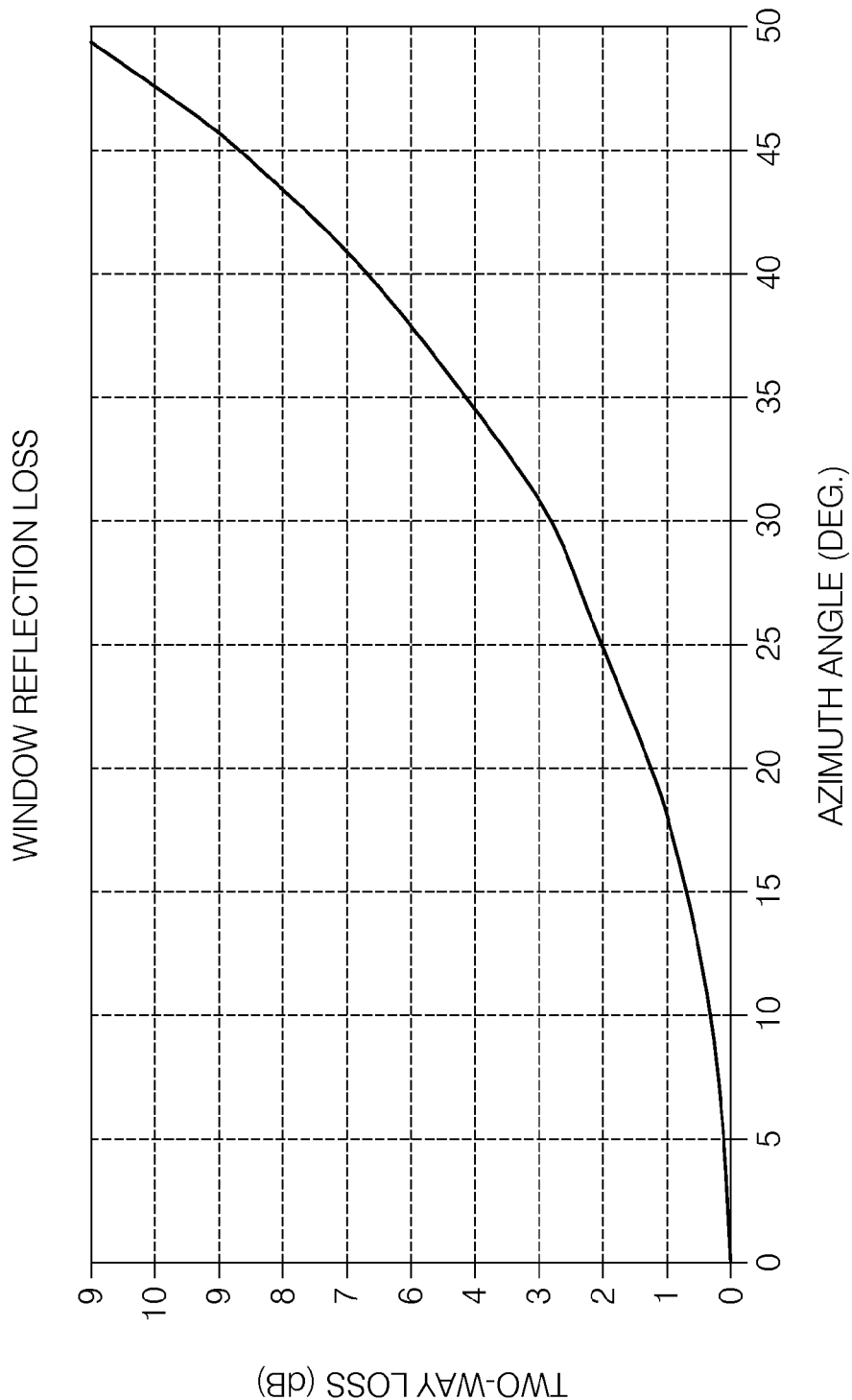
FIG. 13 is a graph illustrating potential additional loss and the impact of the azimuth angle.

Referring to FIG. 13, the impact of the azimuth angle is generally illustrated in terms of additional loss due to reflection loss of windshield based on the azimuth angle. The two-way reflection loss versus azimuth angle shows that an azimuth angle of ±twenty-two and one half degrees (22.5°) for a total coverage zone angle of forty-five degrees (45°) provides for acceptable minimal additional losses.

To minimize package size and overall sensor cost, the module 20 is designed with common (shared) electronics and signal processor subsystems for the radar and camera frontends. Further, the camera optics and imager are integrated into the radar antenna board (a wafer scale camera can be incorporated if needed for integration into the antenna board). The shared signal processor architecture enables fusion of low-level radar and camera data that, in the case of separate radar and camera modules, would otherwise require a high bandwidth interface with attendant increase in cost. Low-level data fusion provides the opportunity for improvements in object size estimation (e.g., length and width), object classification, road geometry estimation, etc.

Installation behind the window 12 may require the glare shield 28 for optimal performance of the camera 22. Further, the EMI shield provided by the parallel plate lens structure 44 may be required or expected to allow optimal use of the radar unit 30. In either case, the shield structures may extend out to meet the window 12. A glare shield or EMI shield may fan-out in size from the camera and/or radar antenna in order to not obscure their field of view and may lead to a larger package size due to the rake angle of the windshield. Incorporation of the EMI shield may obviate the need for a separate camera glare shield. Otherwise, use of refractive block optics is included to eliminate the camera glare shield. To minimize the size of the radar EMI shield, a lens structure for parallel plate propagation may be used to effectively translate the antenna 48 to the window 12 without fan-out of the radar beam. Further, the lens structure may be designed with a dielectric material to 'squint' the beam as needed to obtain the required elevation pointing and coverage.

Another option to minimize the size of (or perhaps eliminate the need for) the glare shield or EMI shield is to incorporate the antenna 48 with tilt-back to orient the antenna parallel (or nearly parallel) to the window 12. The distance between the window 12 and the antenna 48 and camera 22 is thereby minimized and the growth in module package size to extend any outer shield to the window 12 is also minimized. The antenna 48 is then designed with substantial squint in elevation to obtain the required elevation pointing and coverage.

Alignment of the radar unit 30 and the camera 22 with each other and to the vehicle 10 is typically required for proper system performance. The module 20 is designed to support a "net-build" approach, that is, adequate margin in sensor coverage is implemented to eliminate the need for adjustable mechanical alignment features. The joint radar-camera alignment concept incorporates camera-based electronic alignment in the vehicle assembly plant for initial alignment of the system. Then, during on-road operation, camera-based automatic electronic alignment is used to maintain alignment to the vehicle and sensor fusion is used to electronically align the radar unit 30 to the camera 22.

Cost reduction is achieved due to integration of the radar unit 30 and the camera 22 into a single assembly (the module 20) using common (i.e.—shared) subsystems and integrated packaging as described above. Further, installation costs are reduced in two ways; the need to install only a single module and installation of the module 20 behind the window 12. In contrast, current systems typically employ separate radar and camera modules, with the camera typically installed behind the window 12 and the radar typically installed in the front grille area or behind the front bumper. Radar installation in this area often leads to costly mounting brackets and/or costly modifications to the vehicle grille or bumper. Further, the radar component is susceptible to damage in a frontal impact leading to potentially higher repair cost compared to installation behind the windshield.

Further cost reduction is possible with optimized radar-camera fusion to exploit the complementary sensor attributes to minimize the specifications, and thereby cost, of the radar component. That is, the cost of stand-alone radar systems is often driven by the need for multiple narrow beams to meet angle accuracy and angle discrimination requirements. Integration of the camera 22 with appropriate data fusion algorithms can minimize the angle accuracy and discrimination imposed on the radar component since the camera 22 inherently provides excellent angle capability.

Figure 14:
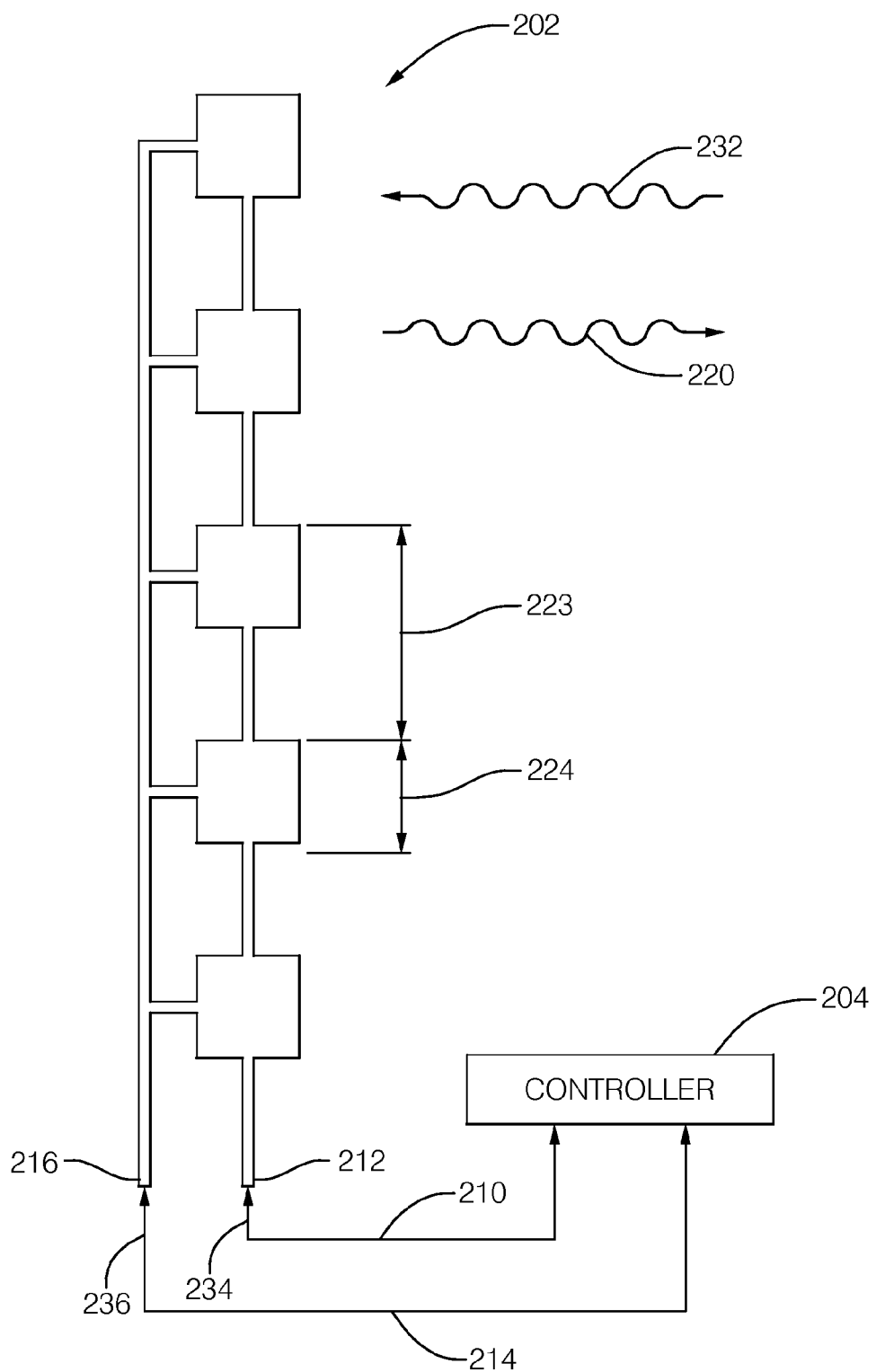
FIG. 14 is a front view of an antenna and controller for the module of FIG. 1 in accordance with one embodiment.

FIG. 14 illustrates a non-limiting example of an antenna 202 and a controller 204 suitable for use by the module 20 shown in FIG. 1. It has been observed that there is generally a preferred angle 206 of propagation of a radar signal 208 (FIG. 1) through the window 12 for a given polarization angle or transmitted polarization 220 of a radar signal 208. The antenna 202 shown may be used for the antenna 48 shown in FIG. 2. The controller 204 may include, but is not limited to, any combination of the various parts forming the radar unit 30 (e.g. the transceiver 32) and the radar camera processing unit 50 (e.g. the video microcontroller) shown in FIG. 2. In other words, the controller 204 is illustrated as shown only to simplify the discussion.

The antenna 202 may be suitably formed of copper foil on a suitable substrate using well-known printed circuit board manufacturing techniques. In general, the antenna 202 is configured to emit the radar signal 208 through the window 12 and into the area 18. The radar signal 208 is characterized by the transmitted polarization 220 of the radar signal 208, where the transmitted polarization 220 is influenced by a first transmit signal 210 received at a first port 212 of the antenna 202, and a second transmit signal 214 received at a second port 216 of the antenna 202.

The controller 204 is generally configured to output the first transmit signal 210 and the second transmit signal 214. The first transmit signal 210 may characterized by a first characteristic such as a first amplitude and/or a first phase, and the second transmit signal 214 may be characterized by a second characteristic such as a second amplitude and/or a second phase. In general, a relative difference between the first characteristic and the second characteristic determines the transmitted polarization 220 of the radar signal 208 and is selected or determined based on the preferred angle 206 of propagation of the radar signal 208 through the window 12. As used herein, the preferred angle 206 may include a rake angle of the window 12, and may be related to an azimuth angle relative to a boresight 222 of the antenna 48. In the non-limiting examples presented herein, the boresight 222 is generally aligned with the longitudinal axis of the vehicle 10. In some instances it may seem that the preferred angle 206 (e.g. FIG. 1) is the same as the azimuth angle or horizontal angle, and so does not include the rake angle of the window 12. It should be understood that the optimal polarization for propagating the radar signal 208 in a particular direction through the window 12 is a function of the angle of incidence of the radar signal relative to the window 12, and so may be related to rake angle and azimuth angle. In application, for a given rake angle, the polarization of the radar signal 208 is adjusted based on the direction (i.e. the preferred angle 206) to an object. The rake angle is an indication of or corresponds to how far away or how far back from a vertical plane the window 12 is tilted. For example, sports cars typically have greater rake angles than a heavy duty truck. The boresight 222 corresponds to a vector that is normal to the plane of the antenna 48 established by the substrate upon which the antenna 48 is built, and is generally aligned with a direction straight ahead of the vehicle 10. The azimuth angle corresponds to the horizontal angle away from the boresight that the radar signal 208 is directed.

Continuing to refer to FIG. 14, and by way of a non-limiting example, the first transmit signal 210 and the second transmit signal 214 may have a zero phase difference relative to each other when they arrive at the patches of the antenna 202 from the first port 212 and the second port 216, but have distinct amplitudes which determines or influences the transmitted polarization 220. Accordingly, for this example, the first characteristic includes a first amplitude of the first transmit signal 210, and the second characteristic includes a second amplitude of the second transmit signal 214. As such, an amplitude difference between the first amplitude and the second amplitude corresponds to or determines the preferred angle 206. By being able to influence or control the transmitted polarization 220 of the radar signal 208, the preferred angle 206 can be controlled or varied so that objects such as the object 16 can be variably illuminated by the radar signal 208. For example, the transmitted polarization 220 may be controlled to maximize the strength of the radar signal 208 propagated through the window 12 at an angle 206 in order to enhance detection of an object 16.

The antenna 202 is sometime referred to as a patch antenna with polarization diversity. If the operating frequency is 76.5 GHz, the antenna 202 may be constructed on a 0.38 millimeter (mm) thick PTFE substrate with a patch size 224 of 1.07 mm square and a patch pitch 226 of 2.98 mm. The transmitted polarization 220 of the example antenna can be controlled by the relative amplitude of signals applied to the first port 212 and the second port 216. The relative amplitude can be expressed as a ratio of the second amplitude over the first amplitude (second amplitude/first amplitude). Then, assuming signals of equal phase are applied to both ports, the transmitted polarization can be calculated by: transmitted polarization=arc tan (second amplitude/first amplitude). If the ratio of the second amplitude over the first amplitude (second amplitude/first amplitude) is less than 1/100, the transmitted polarization 220 is approximately zero degrees (0°) and the polarization of the radar signal 208 may be characterized as vertical. Similarly, if the ratio of the second amplitude over the first amplitude (second amplitude/first amplitude) is greater than 100/1, the transmitted polarization 220 is approximately ninety degrees (90°) and the polarization of the radar signal 208 may be characterized as horizontal. It follows that if the ratio of the second amplitude over the first amplitude (second amplitude/first amplitude) is equal to 1/1, the transmitted polarization 220 is approximately forty-five degrees (45°), and the polarization of the radar signal 208 may be characterized as diagonal.

Figure 15:
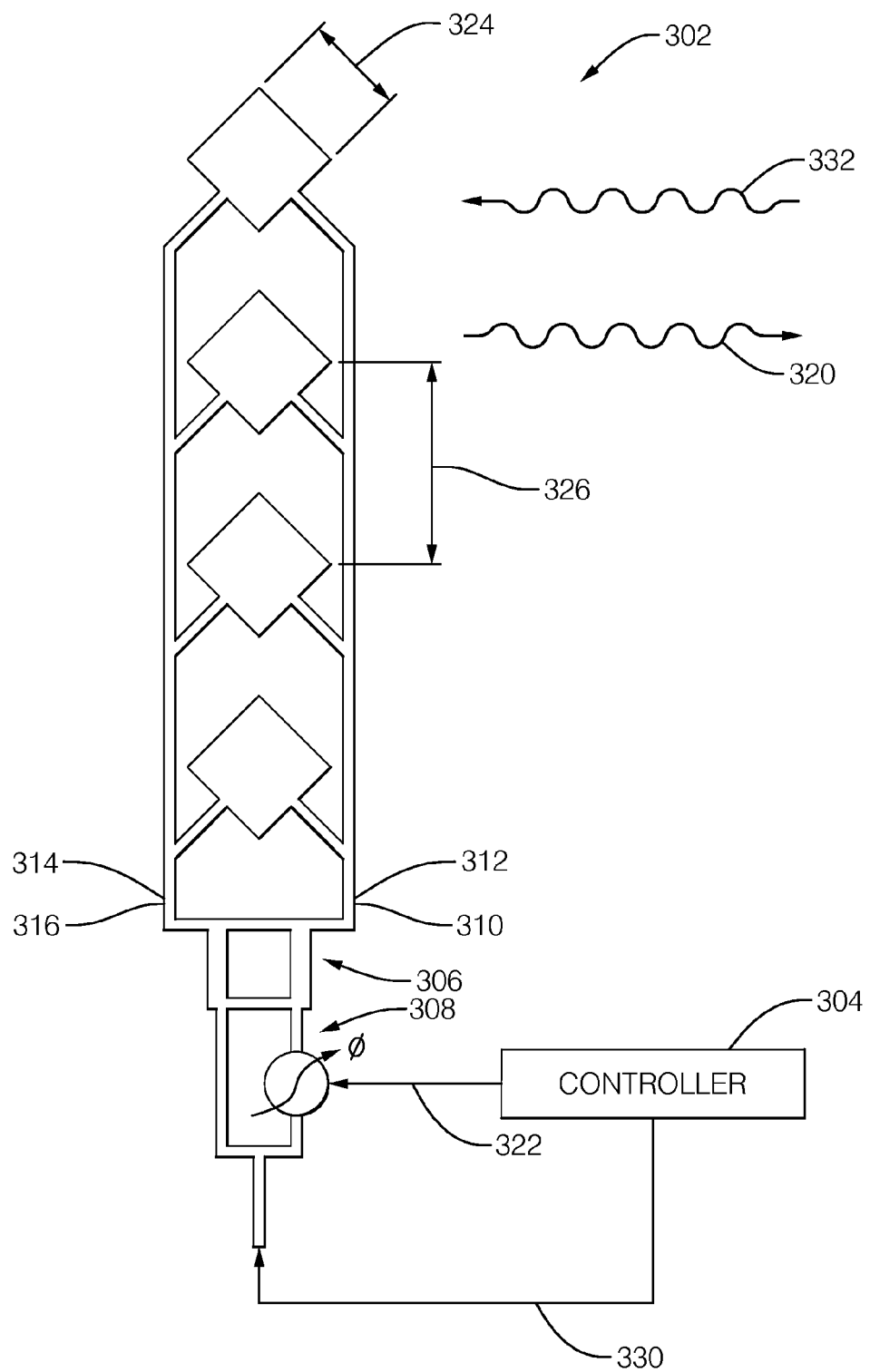
FIG. 15 is a front view of an alternative antenna and controller for the module of FIG. 1 in accordance with one embodiment.

FIG. 15 illustrates another non-limiting example of an antenna 302 and a controller 304 suitable for use by the module 20 shown in FIG. 1. The controller 304 may include a phase shifter 308 and a hybrid coupler 306. It is recognized that the phase shifter 308 and the hybrid coupler 306 could be illustrated as part of the controller 304, but they are shown as separate parts to simplify the description. The controller 304 outputs a transmit signal 330 and a phase control signal 322. The phase shifter 308 and the hybrid coupler 306 may be configured so a first transmit signal 310 is delivered to the first port 312 with a different amplitude and phase relative to a second transmit signal 314 that is delivered to the second port 316. As such, the first characteristic includes a first amplitude and a first phase of the first transmit signal 310, and the second characteristic includes a second amplitude and a second phase of the second transmit signal 314. It follows that a difference between the first amplitude and the first phase and the second amplitude and the second phase corresponds to the preferred angle 206. If the operating frequency is 76.5 GHz, the antenna 302 may be constructed on a 0.38 millimeter (mm) thick PTFE substrate with a patch size 324 of 1.07 mm square and a patch pitch 326 of 2.98 mm. Given the functionality of the hybrid coupler, the difference between the first amplitude and phase and the second amplitude and phase, and thereby the transmitted polarization 320, can be controlled by the amount of phase shift introduced by the phase shifter 308. More specifically, the transmitted polarization 320 can be determined by the halving the phase shift applied by the phase shifter. For example, if the phase shift is zero, the transmitted polarization 320 is approximately zero degrees (0°) so the polarization of the radar signal 208 may be characterized as vertical. Similarly, if the phase shift is 180°, the transmitted polarization 320 is approximately ninety degrees (90°) so the polarization of the radar signal 208 may be characterized as horizontal. It follows that if the phase shift is 90°, the transmitted polarization 320 is approximately forty-five degrees (45°) and the polarization of the radar signal 208 may be characterized as diagonal.

Those skilled in the art will recognize that the antenna 202 the antenna 302 are generally characterized as omnidirectional antennas, and hereafter are referred to generically as the antenna 48. It is recognized that the antennas shown are more accurately described as omnidirectional in the horizontal or azimuth plane, and directional in the vertical plane. It is also recognized that an antenna with only a single patch would be more generally characterized as omnidirectional. It is also recognized that multiples of vertically arranged patches arranged in a horizontal array can be used to emit a radar signal with a narrow beam. Then, well-known scanning techniques may be used to steer or aim the beam in a particular direction. However, as will become clear in the description that follows, the amount of the radar signal 208 emitted by the antenna 48 that is reflected by the window 12 away from the object 16, or propagates through the window 12 toward the object 16, varies with the transmitted polarization 220, 320. As such, the intensity of the radar signal 208 that illuminates the object 16 can be varied by changing the transmitted polarization 220, 320. For example, when using an antenna with directional beam, the intensity of the radar signal 208 that propagates in the direction of beam pointing can be varied or optimized for the incidence angle at the window 12 by changing the transmitted polarization 220, 320.

Figure 16:
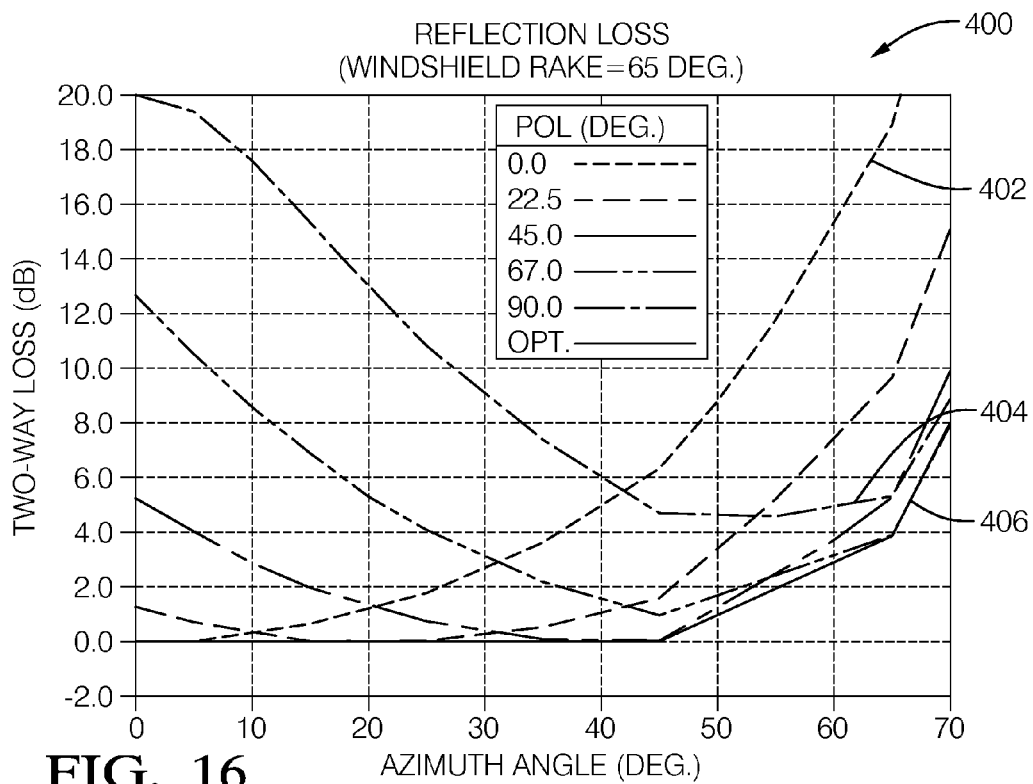
FIG. 16 is a graph of reflection loss versus an azimuth angle relative to a window for various polarization angles in accordance with one embodiment.

FIG. 16 illustrates a non-limiting example of a graph 400 illustrating two-way reflection loss of a radar signal impinging on a window (windshield) with a rake angle of 65° for a variety of transmitted polarizations. Two-way reflection loss accounts for signal loss when the radar signal 208 from the antenna 48 passes through the window 12 plus signal loss when a reflected signal 230 from the object 16 passes back through the window 12 to the antenna 48. For example, if the transmitted polarization 220,320 is zero degrees (0°), the two-way reflection loss (the amount of the radar signal 208 emitted by the antenna 48 plus the amount of signal reflected by the object 16 that is reflected by the window 12) is shown by a curve 402. The two-way loss is zero decibels (0 dB) if the azimuth angle (e.g. the preferred angle 206) is zero degrees (0°), i.e. straight ahead of the vehicle 10 along the boresight 222. However, if the azimuth angle (e.g. the preferred angle 206) is sixty degrees (60°), but the transmitted polarization 220,320 is still zero degrees (0°); the reflection loss reduces the strength of the signal by about 15 dB. In contrast, if the transmitted polarization 220,320 is set to 90°, a curve 404 shows that the transmitted polarization 220,320 of the radar signal 208 along the boresight is reduced by 20 dB, but only reduced by less than 5 dB for an azimuth angle of 60°. As such, it should be apparent that the amount of energy impinging on any object in the area 18 can be varied by changing the transmitted polarization 220, 320, even if the antenna 48 is generally an omnidirectional type antenna. In other words, while the radar signal energy distribution between the antenna 48 and the window 12 may be relatively uniform, the distribution is not uniform after passing through the window 12. Further, when using an antenna with a directional beam, the radar signal energy propagated in the direction of beam pointing can be varied or optimized by changing the transmitted polarization 220, 320. Optimization of the signal energy is this manner may be used, for example, to enhance object detection over a range of beam pointing angles.

The graph 400 also shows a curve 406 that represents the optimum transmitted polarization to use for a particular azimuth angle to minimize reflection loss (i.e.—maximize the amount of energy passing through the window) along a particular azimuth angle. The graph 400 can also be useful to select a compromise transmitted polarization for a given range of azimuth angles, that is, a way to select a fixed transmitted polarization. While only a positive azimuth angle is shown, it should be recognized that the graph 400 could be mirrored about the y-axis to provide a graph that shows two-way loss for both positive and negative azimuth angles. For negative azimuth angle, the polarization angles noted for each curve should be negated as well. For example, referring to graph 400, the two-way loss for a polarization angle of 45 degrees is about 2 dB at 15 degrees of azimuth angle, while at −15 degrees of azimuth angle the two-way loss is 2 dB for a polarization angle of −45 degrees.

Figure 17:
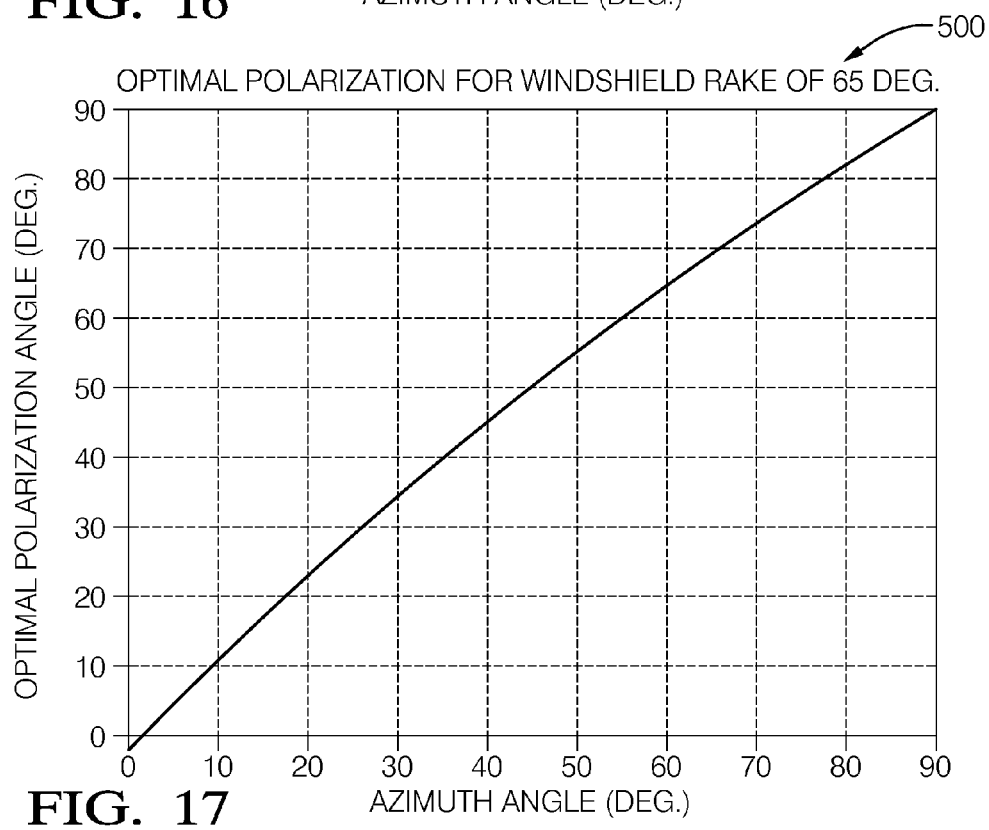
FIG. 17 is a graph of a preferred polarization angle versus reflection loss versus an angle relative to a window for a radar signal in accordance with one embodiment.

FIG. 17 illustrates a non-limiting example of a graph 500 illustrating the optimal polarization (the transmitted polarization 220,320) for detecting an object located at a particular azimuth angle. While only a positive azimuth angle is shown, it should be recognized that for a corresponding negative azimuth angle, the optimal polarization angle shown in graph 500 should be negated. For example, referring to graph 500, at azimuth angle of 40 degrees the optimal polarization angle is about 42 degrees while at azimuth angle of −40 degrees the optimal polarization angle would be −42 degrees.

While the description above has been generally directed to the antenna 48 (202, 302) emitting the radar signal 208 through the window 12 with a particular transmitted polarization 220, 320, it is recognized that the antenna 48 may be used to preferentially detect a reflected signal 230 (FIG. 1) with a particular polarization, e.g. a reflected polarization 232 (FIG. 14) or a reflected polarization 332 (FIG. 15). Accordingly, the antenna 202 may also be configured to output a first detection signal 234 and a second detection signal 236 in response to the reflected signal 230 from the area 18 that passes through the window 12 and impinges on the antenna 202. As will be recognized by those in the art, the controller 204 may be configured to process the first detection signal 234 and the second detection signal 236 is such a way as to preferentially detect the reflected signal 230 when it is characterized by a particular value of the reflected polarization 232. It is expected that reflected signal 230 will exhibit a reflected polarization 232 that corresponds to the transmitted polarization 220 of the radar signal 208 that generated the reflected signal 230. That is, the object 16 may cause the reflected signal 230, which is the reflection of the radar signal 208, to exhibit a reflected polarization 232 comparable to the transmitted polarization 220. In other words, the reflected signal 230 may be partially randomized, but likely not entirely or uniformly randomized. Nevertheless, the preferred polarization of the reflected signal 208 detected by the antenna 48 can be adjusted to optimize for the incidence angle of the reflected signal on the window 12.

Radar systems are often configured to transmit and receive with the same polarization. Exceptions include radars with polarization diversity for target classification or to separate targets from clutter. To enhance target detection by the module 20 operating behind window 12, it is generally preferable to maximize propagation through the window 12 for both transmit and receive. In view of the propagation effects of the window incidence angle vs. polarization angle presented herein, it is thereby generally advantageous to transmit and receive using the same polarization for each preferred angle or beam pointing direction according to an example optimal polarization illustrated in graph 500.

Since the transmitted polarization 220 can be varied to preferentially illuminate the object 16 at a preferred angle 206, and the antenna 202 can be used to preferentially detect the reflected signal 230 with a particular value of the reflected polarization 232, it follows that the controller 204 may be configured to determine an object direction angle (corresponds to the preferred angle 206) based on the first detection signal 234, the second detection signal 236, and the transmitted polarization 220 of the radar signal 208. By way of example and not limitation, the controller 204 may be configured to vary the first transmit signal 210 and the second transmit signal 214 in a manner effective to sweep or incrementally step the value of the transmitted polarization 220, and then using the two-way reflection loss characteristics show in graph 400 (FIG. 16) to compensate the magnitude of the reflected signal 230, the object direction angle (corresponding to the preferred angle 206) may be determined based on the transmitted polarization 220 used when the reflected signal 230 exhibits maximum amplitude.

Accordingly, a sensor module (the module 20) configured to be located behind a window 12 of a vehicle 10 to detect an object 16 through the window 12 and in an area 18 about the vehicle 10 is provided. As described above, the module 20 may also include a camera 22 (FIG. 1) located in the module and configured to capture an image of the area 18. The camera 22 may be useful to identify several objects in the area 18. The improvements described above regarding the use of the transmitted polarization 220 and the reflected polarization 232 to determine the preferred angle 206 to an object may be combined with the image from the camera 22 to better distinguish which objects in the area represent a threat to the vehicle 10, and which objects are likely not threat.

While this invention has been described in terms of the preferred embodiments thereof, it is not intended to be so limited, but rather only to the extent set forth in the claims that follow.

We claim:

1. A sensor module configured to be located behind a window of a vehicle to detect an object through the window and in an area about the vehicle, said module comprising:
    an antenna configured to emit a radar signal through the window and into the area, wherein the radar signal is characterized by a transmitted polarization of the radar signal, wherein the transmitted polarization is influenced by a first transmit signal received at a first port of the antenna and a second transmit signal received at a second port of the antenna; and
    a controller configured to output the first transmit signal and the second transmit signal, wherein the first transmit signal is characterized by a first characteristic, and the second transmit signal is characterized by a second characteristic, wherein a relative difference between the first characteristic and the second characteristic is selected based on a preferred angle of propagation of the radar signal through the window.

2. The module in accordance with claim 1, wherein the preferred angle comprises a rake angle of the window and an azimuth angle relative to a boresight of the antenna.

3. The module in accordance with claim 1, wherein the first characteristic includes a first amplitude of the first transmit signal, and the second characteristic includes a second amplitude of the second transmit signal, wherein an amplitude difference between the first amplitude and the second amplitude corresponds to the preferred angle.

4. The module in accordance with claim 1, wherein the first characteristic includes a first amplitude and a first phase of the first transmit signal, and the second characteristic includes a second amplitude and a second phase of the second transmit signal, wherein a characteristic difference between the first characteristic and the second characteristic corresponds to the preferred angle.

5. The module in accordance with claim 1, wherein the antenna is configured to output a first detection signal and a second detection signal in response to a reflected signal from the area that passes through the window.

6. The module in accordance with claim 5, wherein the controller is configured to determine an object direction angle based on the first detection signal, the second detection signal, and the transmitted polarization of the radar signal.

7. The module in accordance with claim 6, wherein the object direction angle is determined based on the transmitted polarization used when the reflected signal exhibits maximum amplitude.

8. The module in accordance with claim 1, wherein the module further comprises
    a camera component located in the module and configured to capture an image of the area.

9. The module in accordance with claim 8, wherein the antenna is configured to output a first detection signal and a second detection signal in response to a reflected signal from the area that passes through the window, and the controller is further configured to determine an object location relative to the vehicle based on the first detection signal, the second detection signal, the transmitted polarization of the radar signal, and the image of the area.

10. The module in accordance with claim 1, wherein
    the antenna is further configured to output a first detection signal and a second detection signal in response to a reflected signal from the area that passes through the window and impinges on the antenna, wherein the reflected signal is characterized by a received polarization of the reflected signal; and
    the controller is further configured to receive the first detection signal and the second detection signal, wherein the first detection signal is characterized by a first characteristic, and the second detection signal is characterized by a second characteristic, wherein a relative difference between the first characteristic and the second characteristic is selected based on a preferred angle of propagation of the radar signal through the window.

11. The module in accordance with claim 10, wherein the object direction angle is determined based on the reflected polarization used when the reflected signal exhibits maximum amplitude.

12. A sensor module configured to be located behind a window of a vehicle to detect an object through the window and in an area about the vehicle, said module comprising:

an antenna configured to output a first detection signal and a second detection signal in response to a reflected signal from the area that passes through the window and impinges on the antenna, wherein the reflected signal is characterized by a received polarization of the reflected signal; and a controller configured to receive the first detection signal and the second detection signal, wherein the first detection signal is characterized by a first characteristic, and the second detection signal is characterized by a second characteristic, wherein a relative difference between the first characteristic and the second characteristic is selected based on a preferred angle of propagation of the radar signal through the window.

13. The module in accordance with claim 12, wherein the preferred angle comprises a rake angle of the window and an azimuth angle relative to a boresight of the antenna.

14. The module in accordance with claim 12, wherein the object direction angle is determined based on the reflected polarization used when the reflected signal exhibits maximum amplitude.

15. The module in accordance with claim 12, wherein the antenna is further configured to emit a radar signal through the window and into the area, wherein the radar signal is characterized by a transmitted polarization of the radar signal, wherein the transmitted polarization is influenced by a first transmit signal received at a first port of the antenna and a second transmit signal received at a second port of the antenna, and the controller is further configured to output the first transmit signal and the second transmit signal, wherein the first transmit signal is characterized by a first characteristic, and the second transmit signal is characterized by a second characteristic, wherein a relative difference between the first characteristic and the second characteristic is selected based on a preferred angle of propagation of the radar signal through the window.

* * * * *